United States Patent
Kobayashi et al.

(10) Patent No.: US 7,715,706 B2
(45) Date of Patent: May 11, 2010

(54) IMAGING APPARATUS, AND METHOD AND PROGRAM FOR CONTROLLING AN IMAGING APPARATUS

(75) Inventors: Fumikazu Kobayashi, Tokyo (JP); Jun Ohkawa, Tokyo (JP)

(73) Assignee: Sony Corporation (JP)

( * ) Notice: Subject to any disclaimer, the term of this patent is extended or adjusted under 35 U.S.C. 154(b) by 432 days.

(21) Appl. No.: 11/699,319

(22) Filed: Jan. 29, 2007

(65) Prior Publication Data
US 2007/0189759 A1 Aug. 16, 2007

(30) Foreign Application Priority Data
Jan. 30, 2006 (JP) ............... P2006-020795

(51) Int. Cl.
G03B 7/00 (2006.01)
H04N 5/225 (2006.01)
G02B 3/00 (2006.01)
G02B 5/22 (2006.01)

(52) U.S. Cl. .............. 396/275; 396/241; 348/342; 348/360; 359/723; 359/889

(58) Field of Classification Search ........... 396/275, 396/241; 348/360, 224.1, 270, 273, 342; 359/722, 723, 889
See application file for complete search history.

(56) References Cited

U.S. PATENT DOCUMENTS 5,070,407 A * 12/1991 Wheeler et al. ............ 348/342

FOREIGN PATENT DOCUMENTS

| JP | 59-109033 U | 7/1984 |
|---|---|---|
| JP | 62-159058 A | 7/1987 |
| JP | 1-105667 A | 4/1989 |
| JP | 3-217176 A | 9/1991 |
| JP | 7-007651 A | 1/1995 |
| JP | 20000224469 | 8/2000 |
| JP | 2001-045512 A | 2/2001 |
| JP | 2004-120202 A | 4/2004 |

OTHER PUBLICATIONS

English translation of Japanese Office Action issued on Nov. 10, 2009 issued in Japanese Patent Application No. 2006-020795.

* cited by examiner

*Primary Examiner*—Rochelle-Ann J Blackman
(74) *Attorney, Agent, or Firm*—Lerner, David, Littenberg, Krumholz & Mentlik, LLP

(57) ABSTRACT

An imaging apparatus may include an infrared cutoff filter capable of being inserted into and extracted from an incident light path to an image sensing device, and may further include a first detecting unit configured to, when the infrared cutoff filter is off the incident light path to the image sensing device, detect whether the difference between current illuminance of a subject acquired from an image signal of the subject sensed by the image sensing device and a reference value of the illuminance of the subject determined after the infrared cutoff filter was extracted is equal to or greater than a first threshold value, and a filter control unit configured to, when the first detecting unit detects that the difference between the current illuminance and the reference value is equal to or greater than the first threshold value, insert the infrared cutoff filter into the incident light path.

9 Claims, 8 Drawing Sheets

IMAGING APPARATUS, AND METHOD AND PROGRAM FOR CONTROLLING AN IMAGING APPARATUS

CROSS-REFERENCE TO RELATED APPLICATIONS

This application claims priority from Japanese Patent Application No. JP 2006-020795 filed in the Japanese Patent Office on Jan. 30, 2006, the entire content of which is incorporated herein by reference.

BACKGROUND OF THE INVENTION

1. Field of the Invention

The present invention relates to an imaging apparatus and a method and program for controlling an imaging apparatus, and more particularly, to an imaging apparatus and a method and program for controlling an imaging apparatus, capable of providing an image in a highly stable manner in any environment of illumination, by correctly operating an infrared cutoff filter.

2. Description of the Related Art

In a monitor camera, a sensor of the camera generally has high sensitivity in an infrared range. Therefore, in a usual environment in which subjects have high illuminance, an infrared cutoff filter is inserted into an optical path to cut off an infrared component included in incident light thereby allowing it to obtain an image with proper color information. On the other hand, in a dark environment in which subjects have low illuminance, the infrared cutoff filter is removed to achieve high sensitivity which allows it to obtain an image in such a dark environment, although color information is sacrificed. Japanese Unexamined Patent Application Publication No. 2000-224469 discloses a technique to automatically control the operation of inserting or extracting the infrared cutoff filter.

In the monitor camera disclosed in Japanese Unexamined Patent Application Publication No. 2000-224469, illuminance of a subject is calculated from an image signal output from an image sensing device, and the illuminance of the subject is compared with two threshold values (first reference illuminance and second reference illuminance (first reference illuminance<second reference illuminance)) to determine whether to insert or extract the infrared cutoff filter. More specifically, when the illuminance of the subject is lower than the first reference illuminance, the infrared cutoff filter is removed, while the infrared cutoff filter is inserted when the illuminance of the subject is higher than the second reference illuminance.

Referring to FIGS. 1 and 2, a further detailed explanation is given below as to the manner of determining whether to insert or extract the infrared cutoff filter of the monitor camera according to the conventional technique.

In an example shown in FIG. 1, a threshold value $\alpha 1$ and a threshold value $\alpha 3$ are set as the first reference illuminance and the second reference illuminance (such that threshold value $\alpha 1$<threshold value $\alpha 3$), and the insertion/extraction of the infrared cutoff filter is controlled in accordance with the illuminance value relative to the threshold values $\alpha 1$ and $\alpha 3$. In an example shown in FIG. 2, a threshold value $\alpha 1$ is set as the first reference illuminance, and a threshold value $\alpha 2$ is set as the second reference illuminance (threshold value $\alpha 1$<threshold value $\alpha 2$<threshold value $\alpha 3$). In the example shown in FIG. 1, there is a rather large difference between the first reference illuminance and the second reference illuminance. On the other hand, in the example shown in FIG. 2, there is a small difference between the first reference illuminance and the second reference illuminance.

In FIGS. 1 and 2, subject illuminance is represented along a vertical axis, and time passage is represented along a horizontal axis. "ON" denotes a state in which the infrared cutoff filter is inserted in an incident light path, and "OFF" denotes a state in which the infrared cutoff filter is pulled out of the incident light path. Solid lines represent a change in the illuminance of a subject with time, while broken lines represent apparent illuminance (that is, illuminance detected by the monitor camera in the state in which the infrared cutoff filter is pulled out).

First, the example shown in FIG. 1 is explained.

In the state in which the infrared cutoff filter is inserted in the incident light path, the monitor camera repeatedly checks whether the illuminance of the subject has decreased down to a value lower than the threshold value $\alpha 1$ set as the first reference illuminance. If the illuminance of the subject decreases beyond the threshold value $\alpha 1$ at a time T1, the monitor camera further determines whether the luminance of the subject remains lower than the threshold value $\alpha 1$ during a predetermined period of time (a period hatched in FIG. 1). If the illuminance of the subject has remained lower than the threshold value $\alpha 1$ during the predetermined period of time, then, at a time T2 after the predetermined period, the monitor camera pulls the infrared cutoff filter out of the incident light path.

The pulling of the infrared cutoff filter out of the incident light path causes the incident light to include an infrared component without being cut off. Thus, after a short waiting time has elapsed since the time T2 at which the infrared cutoff filter was extracted, an apparent illuminance value of the subject is detected by the monitor camera, and thus the detected illuminance becomes greater than the actual illuminance of the subject. Herein, the term "waiting time" denotes a time needed for an AE (Auto Exposure) mechanism to reach a stable state.

Thereafter, in the state in which the infrared cutoff filter is off the incident light path, the monitor camera continuously checks the illuminance of the subject (the apparent illuminance of the subject) to determine whether the illuminance of the subject has increased beyond the threshold value $\alpha 3$ set as the second reference illuminance.

That is, in the monitor camera in which the second illuminance (the threshold value $\alpha 3$) is set to a rather high value as in the example shown in FIG. 1, even when the illuminance of the subject becomes high enough as denoted by P in FIG. 1, the infrared cutoff filter is not inserted until the apparent illuminance of the subject becomes greater then the threshold value $\alpha 3$ set as the second reference illuminance.

If the illuminance of the subject becomes higher than the threshold value $\alpha 3$ at a time T3, the monitor camera continuously checks the illuminance of the subject to determine whether the illuminance of the subject remains higher than the threshold value $\alpha 3$ during a predetermined period of time. If it is determined that the illuminance of the subject has remained higher than the threshold value $\alpha 3$ during the predetermined period of time, then, at a time T4 after the predetermined period of time, the monitor camera inserts the infrared cutoff filter into the incident light path.

The insertion of the infrared cutoff filter at time T4 causes the infrared component to be cut off from the incident light. After a waiting time has further elapsed since T4, the illuminance of the subject detected by the monitor camera becomes equal to the actual illuminance of the subject.

In the state in which the infrared cutoff filter is again inserted in the incident light path, the monitor camera continuously checks the illuminance of the subject with reference to the threshold values $\alpha1$ and $\alpha3$ set as the first and second reference illuminance values in a similar manner as described above.

Now, the second example is described with reference to FIG. 2. When the monitor camera is in the state in which the infrared cutoff filter is inserted in the incident light path, the monitor camera continuously checks the illuminance of the subject to determine whether the illuminance of the subject has decreased beyond the threshold value $\alpha1$ set as the first reference illuminance.

If the illuminance of the subject decreases beyond the threshold value $\alpha1$ at a time T11, the monitor camera further checks the illuminance of the subject to determine whether the illuminance of the subject remains lower than the threshold value $\alpha1$ during a predetermined period of time. If the illuminance of the subject has remained lower than the threshold value $\alpha1$ during the predetermined period of time. The monitor camera pulls the infrared cutoff filter out of the incident light path at a time T12 after the predetermined period of time.

In this state in which the infrared cutoff filter is off the incident light path, the monitor camera continuously checks the illuminance of the subject to determine whether the illuminance of the subject increases beyond the threshold value $\alpha2$ set as the second reference illuminance.

Note that as a result of the extraction of the infrared cutoff filter, after a time T13 at which a waiting time has further elapsed since the time T12, the illuminance of the subject detected by the monitor camera becomes the apparent illuminance of the subject which is higher than the actual illuminance of the subject. Therefore, in the example shown in FIG. 2, because the difference between the threshold value $\alpha1$ and the threshold value $\alpha2$ is small, the apparent illuminance of the subject can be higher than the threshold value $\alpha2$ even if the actual illuminance of the subject remains lower than the threshold value $\alpha1$.

Thus, in the example shown in FIG. 2, after the illuminance of the subject (the apparent illuminance of the subject) becomes higher than the threshold value $\alpha2$ at a time T13, it is determined that the illuminance of the subject has remained higher than the threshold value $\alpha2$ during a predetermined period of time. Thereafter, at a time T14 after the predetermined period of time, the monitor camera inserts the infrared cutoff filter into the incident light path.

In this state in which the infrared cutoff filter is inserted in the incident light path, the monitor camera continuously checks the illuminance of the subject to determine whether the illuminance of the subject decreases beyond the threshold value $\alpha1$ set as the first reference illuminance. However, as a result of the insertion of the infrared cutoff filter, after a time T15 when a waiting time has elapsed since the time T14, the illuminance of the subject detected by the monitor camera becomes equal to the actual illuminance of the subject lower than the threshold value $\alpha1$.

Thus, after the time T15, if the actual illuminance of the subject camera remains lower than the threshold value $\alpha1$ during a predetermined period of time, it is determined that the illuminance of the subject detected by the monitor camera has remained lower than the threshold value $\alpha1$ during the predetermined period of time, and thus at a time T16 after the predetermined period of time, the monitor camera pulls the infrared cutoff filter output of the incident light path.

Thus, the infrared cutoff filter is again brought into the extracted state, and the monitor camera continuously checks the illuminance of the subject to determine whether the illuminance of the subject increases beyond the threshold value $\alpha2$ set as the second reference illuminance. However, as a result of the extraction of the infrared cutoff filter, after a time T17 when a waiting time has elapsed since the time T16, the apparent illuminance of the subject is again detected by the monitor camera, and thus the detected illuminance becomes higher than the actual illuminance of the subject.

Thus, at the time T17, the detected illuminance of the subject (the apparent illuminance of the subject) becomes higher than the threshold value $\alpha2$, and thereafter it is determined that the illuminance of the subject has remained higher than the threshold value $\alpha2$ during a predetermined period of time. Thus, at a time T18 after the predetermined period of time, the monitor camera inserts the infrared cutoff filter. Subsequently, the process described above is repeated.

In the second example, as described above, the effect of the increase in the apparent illuminance of the subject caused by the extraction of the infrared cutoff filter is not taken into account in the operation. That is, because there is only a small difference between the threshold value $\alpha1$ set as the first reference illuminance and the threshold value $\alpha2$ set as the second reference illuminance, the apparent illuminance of the subject can be higher than the threshold value $\alpha2$ set as the second reference illuminance even when the actual illuminance of the subject is lower than the threshold value $\alpha1$ set as the first reference illuminance. As a result, in the example shown in FIG. 2, the insertion and extraction of the infrared cutoff filter are repeated endlessly at intervals of the particular period needed to insert and extract the infrared cutoff filter.

In the conventional monitor camera, as described above, when the infrared cutoff filter is controlled in accordance with the two threshold values, the two threshold values or the difference therebetween can become improper depending on the environment or the subject. That is, it is difficult to properly set the threshold values and the difference therebetween, and this difficulty can cause an erroneous operation of the infrared cutoff filter.

For example, as described above with reference to FIG. 2, when the difference between the two threshold values is too small, if the illuminance of the subject is close to one of the two threshold values, there is a possibility that the insertion and extraction of the infrared cutoff filter is repeated endlessly, that is, hunting can occur. Conversely, when the difference between the threshold values is too large, there is a possibility that after the infrared cutoff filter is extracted, when the illuminance of the subject again becomes high enough as denoted by P in FIG. 1, the infrared cutoff filter is not re-inserted although the actual illuminance of the subject is high enough and the infrared cutoff filter should be re-inserted.

SUMMARY OF THE INVENTION

In view of the above, it is desirable to provide a technique to properly control the operation of the infrared cutoff filter regardless of the environment of illumination thereby making it possible to take an image in a highly reliable fashion.

According to an embodiment of the present invention, there is provided an imaging apparatus which may include an infrared cutoff filter which is capable of being inserted into and extracted from an incident light path to an image sensing device, comprising first detecting means for, when the infrared cutoff filter is off the incident light path to the image sensing device, detecting whether the difference between current illuminance of a subject acquired from an image signal of the subject sensed by the image sensing device and a reference value of the illuminance of the subject determined after the infrared cutoff filter was extracted is equal to or greater than a first threshold value, and filter control means for, when the first detecting means detects that the difference between the current illuminance of the subject and the reference value of the illuminance of the subject is equal to or greater than the first threshold value, inserting the infrared cutoff filter into the incident light path to the image sensing device.

In the imaging apparatus, the reference value of the illuminance of the subject may be determined by calculating the average of values of the illuminance of the subject of a plurality of frames detected after the infrared cutoff filter was extracted from the incident light path to the image sensing device.

In the imaging apparatus, the first threshold value may be set to an illuminance value corresponding to about 12 dB.

In the imaging apparatus, when the first detecting means detects that the difference between the current illuminance of the subject and the reference value of the illuminance of the subject is equal to or greater than the first threshold value, the first detecting means may further detect whether the difference between the current illuminance of the subject and the reference value of the illuminance of the subject remains equal to or greater than the first threshold value during a predetermined period of time, and when the first detecting means detects that the difference between the current illuminance of the subject and the reference value of the illuminance of the subject has remained equal to or greater than the first threshold value during the predetermined period of time, the filter control means may insert the infrared cutoff filter into the incident light path to the image sensing device.

The imaging apparatus may further comprise second detecting means for, when the first detecting means detects that the difference between the current illuminance of the subject and the reference value of the illuminance of the subject is smaller than the first threshold value, detecting whether the current illuminance of the subject is equal to or greater than a second threshold value, wherein the filter control means may also insert the infrared cutoff filter into the incident light path to the image sensing device when the second detecting means detects that the current illuminance of the subject is equal to or greater than the second threshold value.

In the imaging apparatus, when the second detecting means detects that the current illuminance of the subject is equal to or greater than the second threshold value, the second detecting means may further detect whether the current illuminance of the subject remains equal to or greater than the threshold value during a predetermined period of time, and the filter control means may also insert the infrared cutoff filter into the incident light path to the image sensing device when the second detecting means detects that the current illuminance of the subject has remained equal to or greater than the second threshold value during the predetermined period of time.

According to an embodiment of the invention, there is provided a method of controlling an imaging apparatus which may include an infrared cutoff filter which is capable of being inserted into and extracted from an incident light path to an image sensing device, comprising the steps of, when the infrared cutoff filter is off the incident light path to the image sensing device, detecting whether the difference between current illuminance of a subject acquired from an image signal of the subject sensed by the image sensing device and a reference value of the illuminance of the subject determined after the infrared cutoff filter was extracted is equal to or greater than a first threshold value, and when the first detecting means detects that the difference between the current illuminance of the subject and the reference value of the illuminance of the subject is equal to or greater than the first threshold value, inserting the infrared cutoff filter into the incident light path to the image sensing device.

According to an embodiment of the invention, there is provided a program for causing a computer to control an imaging apparatus including an infrared cutoff filter which is capable of being inserted into and extracted from an incident light path to an image sensing device, which may comprise the steps of, when the infrared cutoff filter is off the incident light path to the image sensing device, detecting whether the difference between current illuminance of a subject acquired from an image signal of the subject sensed by the image sensing device and a reference value of the illuminance of the subject determined after the infrared cutoff filter was extracted is equal to or greater than a first threshold value, and when the first detecting means detects that the difference between the current illuminance of the subject and the reference value of the illuminance of the subject is equal to or greater than the first threshold value, inserting the infrared cutoff filter into the incident light path to the image sensing device.

According to an embodiment of the invention, there is provided an imaging apparatus adapted to take an image of a subject, which may comprise control means for controlling the imaging apparatus, image sensing means including an image sensing device, an infrared cutoff filter which is capable of being inserted into an incident light path to the image sensing device, illuminance calculation means for calculating current illuminance of the subject from an image signal of the subject sensed by the image sensing device in a state in which the infrared cutoff filter is extracted from the incident light path, and reference value calculation means for calculating a reference value of the illuminance of the subject, for use in the state in which the infrared cutoff filter is extracted, wherein the control means controls the insertion and the extraction of the infrared cutoff filter in accordance with a relative comparison between the current illuminance of the subject calculated by the illuminance calculation means and the reference value of the illuminance of the subject calculated by the reference value calculation means.

In the imaging apparatus according to an embodiment of the present invention, as described above, when the infrared cutoff filter is off the incident light path to the image sensing device, a determination may be made as to whether the difference between current illuminance of a subject acquired from an image signal of the subject sensed by the image sensing device and a reference value of the illuminance of the subject determined after the infrared cutoff filter was extracted is equal to or greater than a first threshold value, and when it is determined that the difference between the current illuminance of the subject and the reference value of the illuminance of the subject is equal to or greater than the first threshold value, the infrared cutoff filter may be inserted into the incident light path to the image sensing device.

In the imaging apparatus according to another embodiment of the present invention, as described above, when the infrared cutoff filter is off the incident light path to the image sensing device, the current illuminance of the subject acquired from an image signal of the subject sensed by the image sensing device may be calculated, and the reference value of the illuminance of the subject in the state in which the infrared cutoff filter is extracted may be determined. A relative comparison is made between the current illuminance of the subject and the reference value of the illuminance of the subject, and the infrared cutoff filter may be inserted or extracted in accordance with the comparison result.

The present invention is applicable to various types of imaging apparatuses such as a monitor camera, a digital still camera, a video tape recorder integrated with a camera, a portable terminal device with a camera, etc.

The present invention provides great advantages that it is possible to correctly control the operation of the infrared cutoff filter regardless of the environment thereby achieving high reliability in taking an image.

DETAILED DESCRIPTION

Before embodiments of the present invention are described, correspondence between specific examples of parts/steps in the embodiments and those in the respective claims is described. Note that the purpose of the following description is to indicate that specific examples corresponding to the respective claims are described in the embodiments, and thus the purpose of the following description is not to limit specific examples of the respective claims to those described below. That is, there can be a part/step that is not described in the following description of the correspondence but that corresponds to a part/step of a particular claim. Conversely, an example of a part/step, which is described in the following description as corresponding to a particular claim, can correspond to a part/step of another claim.

Figure 3:
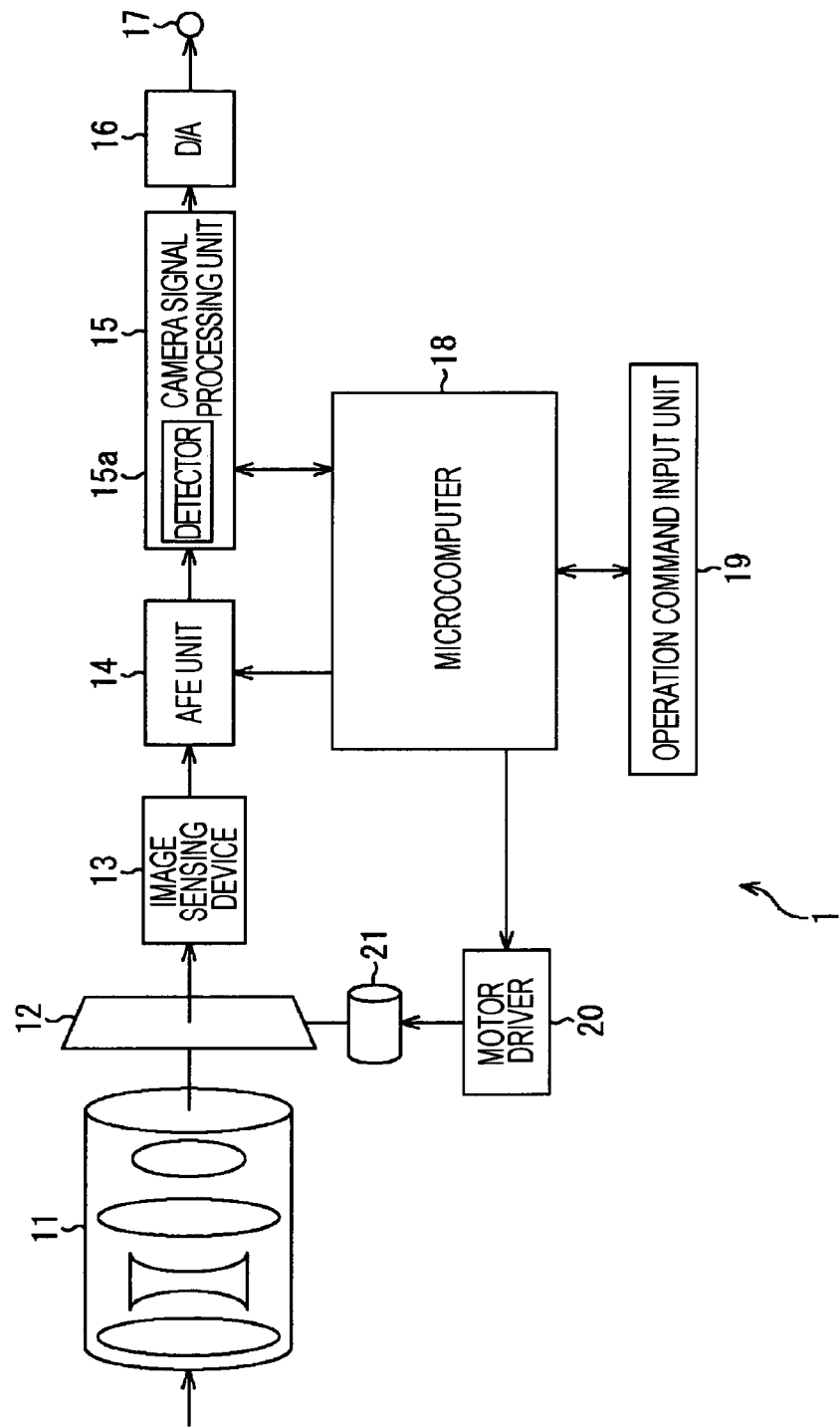
FIG. 3 is a block diagram showing an example of a configuration of a monitor camera according to an embodiment of the present invention.

According to an embodiment of the present invention, there is provided an imaging apparatus (for example, a monitor camera 1 shown in FIG. 3) including an infrared cutoff filter (for example, an infrared cutoff filter 12 shown in FIG. 3) which is capable of being inserted into and extracted from an incident light path (for example, a path between an optical system 11 and an image sensing device 13 shown in FIG. 3) to an image sensing device (for example, the image sensing device 13 shown in FIG. 3), comprising first detecting means (for example, an illuminance judgment unit 42 shown in FIG. 4) for, when the infrared cutoff filter is off the incident light path to the image sensing device, detecting whether the difference between current illuminance of a subject acquired from an image signal of the subject sensed by the image sensing device and a reference value (for example, a reference value A1 shown in FIG. 5) of the illuminance of the subject determined after the infrared cutoff filter was extracted is equal to or greater than a first threshold value (for example, a threshold value Th2 shown in FIG. 5), and filter control means (for example, a switching controller 31 shown in FIG. 4) for, when the first detecting means detects that the difference between the current illuminance of the subject and the reference value of the illuminance of the subject is equal to or greater than the first threshold value, inserting the infrared cutoff filter into the incident light path to the image sensing device.

The imaging apparatus may further comprise second detecting means (for example, a high-illuminance judgment unit 43 shown in FIG. 4) for, when the first detecting means detects that the difference between the current illuminance of the subject and the reference value of the illuminance of the subject is smaller than the first threshold value, detecting whether the current illuminance of the subject is equal to or greater than a second threshold value (for example, a threshold value Th3 shown in FIG. 5), wherein the filter control means also inserts the infrared cutoff filter into the incident light path to the image sensing device when the second detecting means detects that the current illuminance of the subject is equal to or greater than the second threshold value.

According to an embodiment of the present invention, there is provided a method/program of controlling an imaging apparatus (for example, a monitor camera 1 shown in FIG. 3) including an infrared cutoff filter (for example, an infrared cutoff filter 12 shown in FIG. 3) which is capable of being inserted into and extracted from an incident light path. (for example, a path between an optical system 11 and an image sensing device 13 shown in FIG. 3) to an image sensing device (for example, the image sensing device shown in FIG. 3), comprising the steps of, when the infrared cutoff filter is off the incident light path to the image sensing device, detecting whether the difference between current illuminance of a subject acquired from an image signal of the subject sensed by the image sensing device and a reference value of the illuminance of the subject determined after the infrared cutoff filter was extracted is equal to or greater than a first threshold value (for example, in step S16 shown in FIG. 7), and when the first detecting means detects that the difference between the current illuminance of the subject and the reference value of the illuminance of the subject is equal to or greater than the first threshold value, inserting the infrared cutoff filter into the incident light path to the image sensing device (for example, in step S22 shown in FIG. 7).

According to an embodiment of the present invention, there is provided an imaging apparatus (for example, a monitor camera 1 shown in FIG. 3) adapted to take an image of a subject, comprising control means (for example, a switching controller 31 shown in FIG. 4) for controlling the imaging apparatus, image sensing means (for example, an image sensing device 13 shown in FIG. 3) including an image sensing device, an infrared cutoff filter (for example, an infrared cutoff filter 12 shown in FIG. 3) which is capable of being inserted into an incident light path to the image sensing device, illuminance calculation means (for example, a detector 15a shown in FIG. 3) for calculating current illuminance of the subject from an image signal of the subject sensed by the image sensing device in a state in which the infrared cutoff filter is extracted from the incident light path, and reference value calculation means (for example, a reference value calculation unit 35 shown in FIG. 4) for calculating a reference value of the illuminance of the subject, for use in the state in which the infrared cutoff filter is extracted, wherein the control means controls the insertion and the extraction of the infrared cutoff filter in accordance with a relative comparison between the current illuminance of the subject calculated by the illuminance calculation means and the reference value of the illuminance of the subject calculated by the reference value calculation means.

Now, the present invention is described in detail below with reference to preferred embodiments in conjunction with the accompanying drawings.

FIG. 3 is a block diagram showing an example of a configuration of an imaging apparatus used as a monitor camera, according to an embodiment of the present invention.

The monitor camera 1 shown in FIG. 3 is installed, for example, at an upper position in a particular space to take an image of a subject present in the particular space. The monitor camera 1 includes an infrared cutoff filter 12 which is capable of inserting into and pulled out of an incident light path to an image sensing device 13. When a subject has high illuminance, the infrared cutoff filter 12 is inserted into the incident light path to the image sensing device 13 to allow it to obtain an image with proper color information. On the other hand, when a subject has low illuminance, the infrared cutoff filter 12 is pulled out of the incident light path to the image sensing device 13. In this state, in the operation of taking an image of the subject, higher priority is given to sensitivity than to color information. The acquired image signal is output, for example, to a monitor (not shown) to display the image thereon.

The monitor camera 1 includes an optical system 11, an infrared cutoff filter 12, an image sensing device 13, an AFE (Analog Front End) unit 14, a camera signal processing unit 15, a D/A (Digital/Analog) converter 16, an output terminal 17, a microcomputer 18, an operation command input unit 19, a motor driver 20, and a filter driving motor 21.

The optical system 11 includes a lens and serves to focus an optical image of a subject on the image sensing device 13. The infrared cutoff filter 12 cuts off an infrared component included in light incident from the optical system 11.

The image sensing device 13 may be realized, for example, by a solid-state image sensor such as a CCD (Charge-Coupled Device) or an X-Y addressed solid-state image sensor such as a CMOS (Complementary Metal Oxide Semiconductor) sensor. An image signal of a subject output from the image sensing device 13 is supplied to the AFE unit 14.

The AFE unit 14 includes, although not shown in the figure, a CDS (Correlated Double Sampling) circuit, an AGC (Automatic Gain Control) circuit, an A/D (Analog/Digital) converter, etc. In the AFE unit 14, for example, the CDS circuit removes a noise component from the input image signal, the AGC circuit adjusts the gain of the image signal, and the A/D converter converts the analog image signal into a digital image signal. The resultant image signal is output to the camera signal processing unit 15.

The camera signal processing unit 15 is realized, for example, by a DSP (Digital Signal Processor) including therein a detector 15a. The camera signal processing unit 15 performs particular signal processing on the image signal supplied from the AFE unit 14 and outputs the resultant image signal to a D/A converter 16. The detector 15a determines illuminance of a subject from the image signal supplied from the AFE unit 14, and supplies the determined illuminance of the subject to the microcomputer 18. The illuminance of subjects is expressed, for example, in units of luces.

The D/A converter 16 converts the digital image signal into an analog image signal and outputs the resultant analog image signal to a video output terminal 17. The image signal supplied from the D/A converter 16 is output to a monitor or the like (not shown) connected to the video output terminal 17.

When the illuminance of the subject is high, the infrared cutoff filter 12 is inserted into the incident light path to the image sensing device 13. In this state, a color image with proper color information can be obtained, and the obtained color image of the subject is output to the monitor. On the other hand, when the illuminance of the subject is low, the infrared cutoff filter 12 is pulled out of the incident light path to the image sensing device 13. In this state, an image of the subject is produced in such a manner that higher priority is given to sensibility than to color information, and the resultant image is output, in the form of a monochrome image, to the monitor.

The microcomputer 18 includes, for example, a CPU (Central Processing Unit), a ROM (Read Only Memory), a RAM (Random Access Memory), etc., and is adapted to perform various kinds of processes by executing programs in accordance with an operation signal supplied from the operation command input unit 19.

The microcomputer 18 compares the illuminance of the subject supplied from the detector 15a with a predetermined threshold value, and, in accordance with a comparison result, the microcomputer 18 gives a command to the infrared cutoff filter 12 to drive the motor driver 20.

The operation command input unit 19 includes, for example, buttons and/or a dial disposed on a case of the monitor camera 1 or a touch panel disposed on a monitor screen (not shown), and is adapted to supply an operation signal corresponding to an operation performed by a user to the microcomputer 18.

The motor driver 20 controls the operation of the filter driving motor 21 in accordance with the drive command received from the microcomputer 18. Under the control of the motor driver 20, the filter driving motor 21 inserts or pulls the infrared cutoff filter 12 into or out of a position between the optical system 11 and the image sensing device 13, that is, into or out of the input light path to the image sensing device 13.

Figure 4:
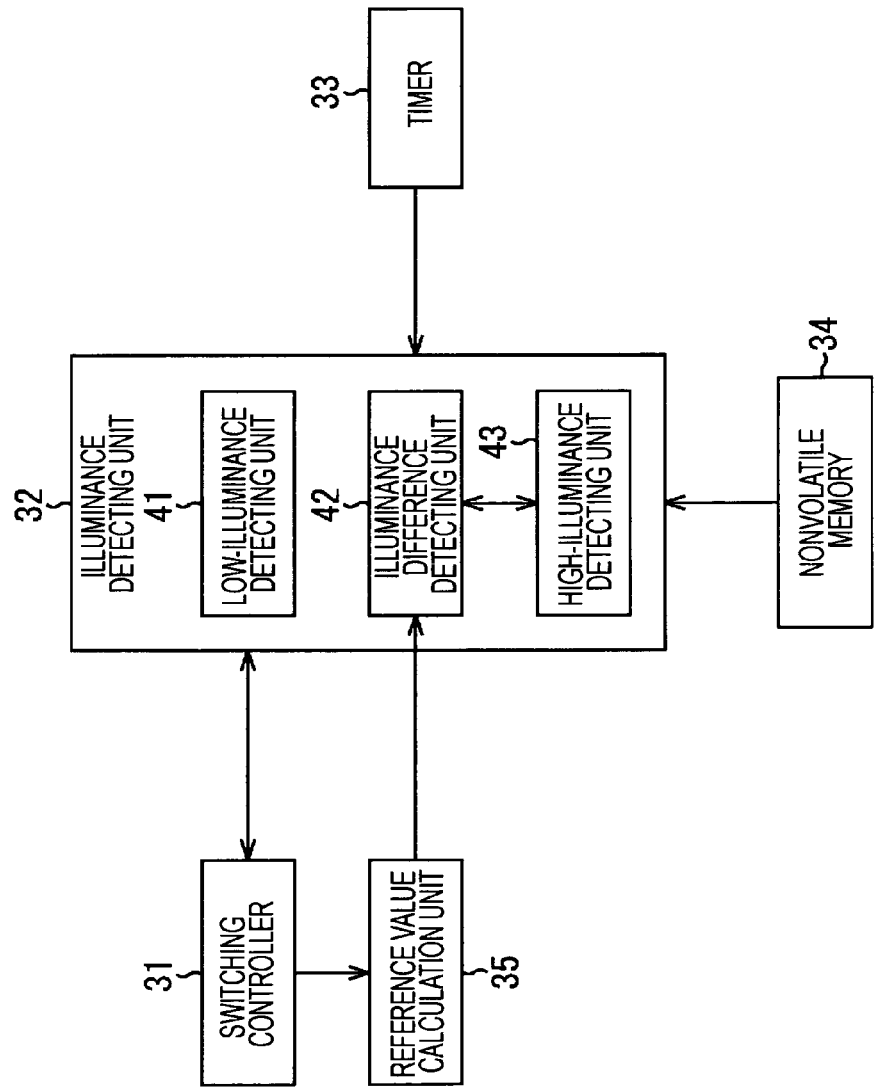
FIG. 4 is a block diagram showing an example of a functional configuration of a microcomputer shown in FIG. 3.

FIG. 4 shows an example of a functional block configuration of the microcomputer shown in FIG. 3. Note that the functional blocks including the switching controller 31, an illuminance judgment unit 32, a reference value calculation unit 35, etc. shown in FIG. 4 are implemented by reading and executing a particular program by the microcomputer 18.

In the example shown in FIG. 4, the microcomputer 18 includes the switching controller 31, the illuminance judgment unit 32, a timer 33, a nonvolatile memory 34, and a reference value calculation unit 35.

The switching controller 31 stores insertion/extraction state data indicating whether the infrared cutoff filter 12 is in an inserted state or a pulled-out state, and the switching controller 31 controls the illuminance judgment unit 32 and the reference value calculation unit 35 in accordance with the insertion/extraction state of the infrared cutoff filter 12.

When the infrared cutoff filter 12 is in the inserted state, the switching controller 31 makes a low-luminance judgment unit 41 of the illuminance judgment unit 32 perform a comparison of the illuminance of the subject. On the other hand, when the infrared cutoff filter 12 is in the pulled-out state, the switching controller 31 makes the reference value calculation unit 35 determine the reference value of the illuminance of the subject and makes an illuminance difference judgment unit 42 and a high-illuminance judgment unit 43 of the illuminance judgment unit 32 perform a comparison of the illuminance of the subject.

In accordance with a result of the determination made by the illuminance judgment unit 32, the switching controller 31 controls the motor driver 20 to drive the infrared cutoff filter 12, and the switching controller 31 updates the stored insertion/extraction state data so as to indicate the current insertion/extraction state of the infrared cutoff filter 12.

The illuminance judgment unit 32 includes a low-illuminance judgment unit 41, an illuminance difference judgment unit 42, and a high-illuminance judgment unit 43. Under the control of the switching controller 31, the illuminance judgment unit 32 reads a predetermined threshold value stored in the nonvolatile memory 34 and compares the current illuminance of the subject supplied from the detector 15*a* with the predetermined threshold value. A comparison result is supplied to the switching controller 31. The illuminance judgment unit 32 starts the counting operation of the timer 33, as required.

Figure 1:
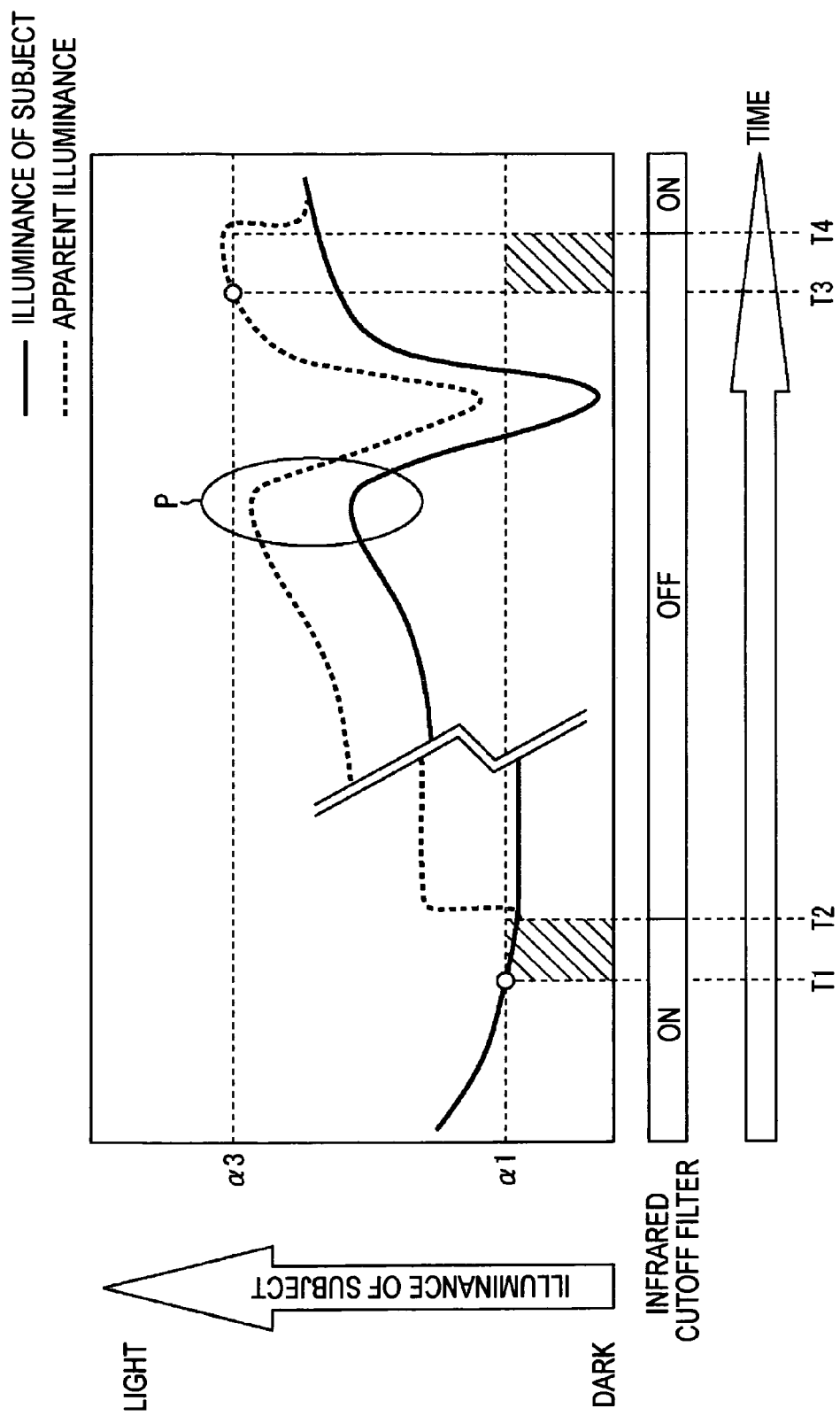
FIG. 1 is a diagram showing an example of a manner of determining whether to insert or extract an infrared cutoff filter according to a known technique.

More specifically, the low-illuminance judgment unit 41 reads a threshold value Th1 (corresponding to a threshold value α1 shown in FIG. 1) from the nonvolatile memory 34, and the low-illuminance judgment unit 41 compares the current subject illuminance with the threshold value Th1 and notifies the switching controller 31 of a comparison result.

That is, the low-illuminance judgment unit 41 determines whether the current illuminance of the subject is low, by detecting whether the current illuminance of the subject luminance is equal to or lower than the threshold value Th1. When the current illuminance of the subject is equal to or lower than the threshold value Th1, the low-illuminance judgment unit 41 starts the counting operation of the timer 33, and continuously checks the illumination of the subject to determine whether the illuminance of the subject remains equal to or lower than the threshold value Th1 during a predetermined time period counted by the timer 33. A determination result is sent to the switching controller 31.

The illuminance difference judgment unit 42 reads a threshold value Th2 from the nonvolatile memory 34, determines the difference between the current illuminance of the subject and the reference value supplied from the reference value calculation unit 35, compares the determined difference with the threshold value Th2, and notifies the switching controller 31 of the result.

The illuminance difference judgment unit 42 determines whether the difference between the current illuminance of the subject and the reference value is equal to or greater than the threshold value Th2 thereby detecting whether the current illuminance of the subject is high enough. When the difference between the current illuminance of the subject and the reference value is equal to or greater than the threshold value Th2, the illuminance difference judgment unit 42 starts the counting operation of the timer 33 and continuously checks the current illuminance of the subject to determine whether the difference between the current illuminance of the subject and the reference value remains equal to or greater than the threshold value Th2 during a period of time counted by the timer 33, and the illuminance difference judgment unit 42 notifies the switching controller 31 of a determination result.

The high-illuminance judgment unit 43 reads a threshold value Th3 (Th3>Th1 (corresponding to a threshold value α3 shown in FIG. 1)) from the nonvolatile memory 34, compares the current illuminance of the subject with the threshold value Th3, and notifies the switching controller 31 of a comparison result.

That is, the high-illuminance judgment unit 43 determines whether the current illuminance of the subject is high by detecting whether the current illuminance of the subject is equal to or greater than threshold value Th3. When the current illuminance of the subject is equal to or greater than threshold value Th3, the high-illuminance judgment unit 43 starts the counting operation of the timer 33, and continuously checks the illuminance of the subject to determine whether the illuminance of the subject remains equal to or greater than threshold value Th3 during a period of time counted by the timer 33, and the high-illuminance judgment unit 43 notifies the switching controller 31 of a determination result.

Timer 33 starts counting in response to a count start command issued by the low-illuminance judgment unit 41, the illuminance difference judgment unit 42, or the high-illuminance judgment unit 43 and continues the counting operation until a preset counter time (for example, 5 seconds) has elapsed.

The nonvolatile memory 34 stores the threshold value Th1 read by the low-illuminance judgment unit 41, the threshold value Th2 read by the illuminance difference judgment unit 42, and the threshold value Th3 read by the high-illuminance judgment unit 43. A user is allowed to set these threshold values Th1 to Th3 to desired values by operating the operation command input unit 19.

Under the control of the switching controller 31, the reference value calculation unit 35 determines the reference value of the illuminance of the subject in the status in which the infrared cutoff filter 12 is pulled out. More specifically, the reference value calculation unit 35 acquires illuminance of the subject for a predetermined number of frames during the predetermined period of time after the infrared cutoff filter 12 is extracted, and the reference value calculation unit 35 calculates the average of the acquired illuminance values of the subject. The calculated average value is supplied as the reference value to the illuminance difference judgment unit 42.

Figure 5:
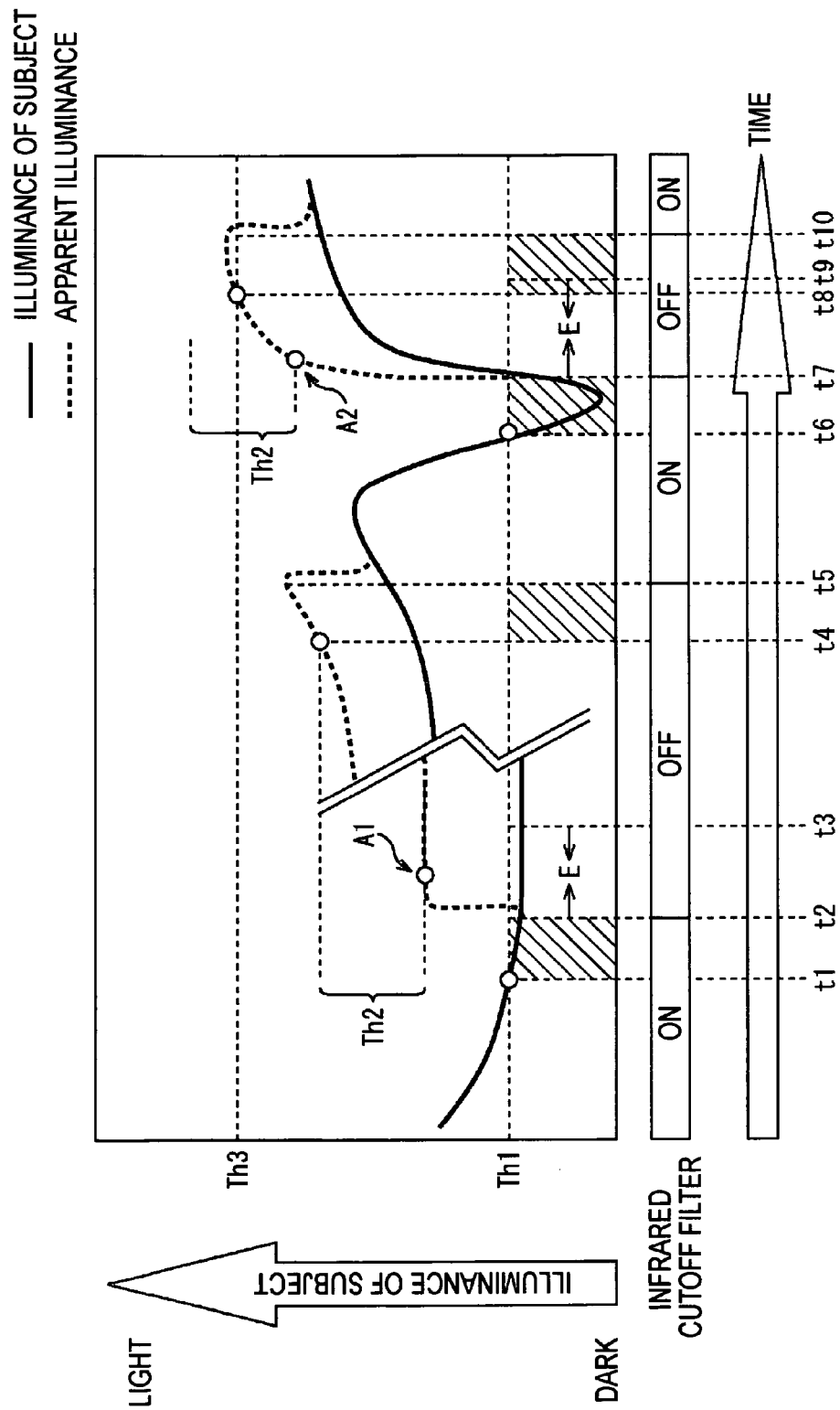
FIG. 5 is a diagram showing an example of a manner of determining whether to insert or extract an infrared cutoff filter according to an embodiment of the present invention.

Now, referring to FIG. 5, the operation of determining whether to insert or extract the infrared cutoff filter 12 of the monitor camera 1 shown in FIG. 3 is explained.

In the example shown in FIG. 5, subject illuminance is represented along a vertical axis, and time passage is represented along a horizontal axis. "ON" denotes a state in which the infrared cutoff filter 12 is inserted in an incident light path to the image sensing device 13, and "OFF" denotes a state in which the infrared cutoff filter 12 is off the incident light path to the image sensing device 13. Solid lines represent a change in the illuminance of a subject with time, while broken lines represent apparent illuminance (that is, illuminance detected by the monitor camera 1 in the state in which the infrared cutoff filter 12 is pulled out).

In FIG. 5, in the state in which the infrared cutoff filter 12 is inserted in the incident light path to the image sensing device 13, the low-illuminance judgment unit 41 of the monitor camera 1 continuously checks the illuminance of the subject to determine whether it is equal to or lower than the threshold value Th1 (luces). In the monitor camera 1, the infrared cutoff filter 12 is pulled out of the incident light path when a condition described in the form of inequality (1) is satisfied.

$$Ic \leq Th1 \quad (1)$$

where Ic is the current illuminance of the subject (expressed in luces).

If the illuminance of the subject is equal to or lower than the threshold value Th1 at a time t1, the low-illuminance judgment unit 41 detects that the illuminance of the subject is low. In this case, the low-illuminance judgment unit 41 further continuously checks the illuminance of the subject to determine whether the illuminance of the subject remains equal to or lower than the threshold value Th1 during a predetermined period of time (during a period hatched in FIG. 5 with a length of, for example, 5 seconds).

The reason why checking is performed as to whether the illuminance of the subject remains equal to or lower than the threshold value Th1 during the predetermined period of time after the detection of the decrease in the illuminance of the subject beyond the threshold value Th1 is to prevent the infrared cutoff filter 12 from being incorrectly extracted due to a temporary short-time reduction in the illuminance such as a disturbance. This also applies to the threshold values Th2 and Th3.

If the illuminance of the subject has remained equal to or lower than the threshold value Th1 during the predetermined period of time, the monitor camera 1 pulls the infrared cutoff filter 12 out of the incident light path at a time t2 after the predetermined period of time. The extraction of the infrared cutoff filter 12 causes the incident light to include an infrared component without being cut off. As a result, after the time t2, apparent illuminance of the subject represented by a broken line is detected as the illuminance of the subject by the monitor camera 1, and thus the detected illuminance becomes higher than the actual illuminance of the subject.

When a waiting time (for example, about 50 frames×16.7 msec) needed for stabilization of an AE (Auto Exposure) mechanism has elapsed since the extraction of the infrared cutoff filter 12, that is, when the illuminance of the subject (the apparent illuminance of the subject) detected by the monitor camera has reached a stable value higher than the actual illuminance of the subject, the reference value calculation unit 35 of the monitor camera 1 calculates the reference value A1 of the illuminance of the subject from the detected illuminance.

More specifically, when the waiting time has elapsed since the time t2, the reference value calculation unit 35 acquires a plurality of values of the illuminance of the subject (the apparent illuminance of the subject) for a predetermined period E (for example, 200 frames×16.7 msec), and, at a time t3 after the predetermined period E, the reference value calculation unit 35 calculates the average of the acquired values. The calculated average value is supplied, as the reference value A1 with reference to which to determine whether to re-insert the infrared cutoff filter 12, to the illuminance difference judgment unit 42.

The illuminance difference judgment unit 42 determines a value by subtracting the reference value A1 from the current illuminance of the subject (the current apparent illuminance of the subject) every frame or every two or more frames, and the illuminance difference judgment unit 42 compares the resultant value with the threshold value Th2 (dB). In this state, the monitor camera 1 re-inserts the infrared cutoff filter 12 when a condition described in the form of inequality (2) is satisfied.

$$\left( Ic - \frac{\sum_{f1}^{fn} If}{n} \right) \geq Th2 \quad (2)$$

where Ic is the current illuminance (luces) of the subject, If is the illuminance (luces) of the subject of a frame, and n is the number of frames whose illuminance is detected to calculate the reference value. In inequality (2), the second term on the left side represents the reference value, and thus inequality (2) indicates that Ic is subtracted from the reference value given as the average of values of illuminance If of frames f1 to fn and the result is compared with the threshold value Th2. The threshold value Th2 is set, for example, to illuminance (luces) corresponding to 12 dB.

If it is detected at a time t4 that the difference between the illuminance of the subject and the reference value A1 is equal to or higher than the threshold value Th2, the illuminance difference judgment unit 42 determines that the current illuminance of the subject is high enough, and further continuously checks the illuminance of the subject to determine whether the difference between the illuminance of the subject and the reference value A1 remains equal to or greater than the threshold value Th2 during a predetermined period of time (for example 5 seconds).

If it is determined that the difference between the illuminance of the subject and the reference value A1 has remained equal to or greater than the threshold value Th2, then, at a time t5 after the predetermined period of time, the monitor camera 1 inserts the infrared cutoff filter 12 into the incident light path. The insertion of the infrared cutoff filter 12 at time t5 causes the infrared component to be cut off from the incident light. After a waiting time has further elapsed since t5, the illuminance of the subject detected by the monitoring camera becomes equal to the actual illuminance of the subject as denoted by a solid line in FIG. 5.

In this state in which the infrared cutoff filter 12 is inserted in the incident light path, the low-illuminance judgment unit 41 of the monitor camera 1 again determines whether the illuminance of the subject is equal to or lower than the threshold value Th1.

If the illuminance of the subject decreases beyond the threshold value Th1 at a time t6, the low-illuminance judgment unit 41 determines that the illuminance of the subject is low and further continuously checks the illuminance of the subject to determine whether the illuminance of the subject remains equal to or lower than the threshold value Th1 during the predetermined period of time.

If the illuminance of the subject has remained equal to or lower than the threshold value Th1 during the predetermined period of time, the monitor camera 1 pulls the infrared cutoff filter 12 out of the incident light path at a time t7 after the predetermined period of time. The extraction of the infrared cutoff filter 12 causes the incident light to include an infrared component without being cut off. As a result, after the time t7, apparent illuminance of the subject is detected as the illuminance of the subject by the monitor camera 1, and thus the detected illuminance becomes higher than the actual illuminance of the subject.

The reference value calculation unit 35 of the monitor camera 1 again acquires values of the illuminance of the subject (the apparent illuminance of the subject) for the predetermined period E after the waiting time has elapsed since the time t7. At a time t9 after the predetermined period E, the reference value calculation unit 35 calculates the average of the acquired illuminance values of the subject. The calculated average value is supplied, as the reference value A2 with reference to which to determine whether to re-insert the infrared cutoff filter 12, to the illuminance difference judgment unit 42.

However, in this specific case, the reference value was determined (in the period from t7 to t9) in a situation in which a temporary short-time increase in the illuminance of the subject occurred, and thus the resultant reference value A2 is invalid. This can cause the difference between the illuminance of the subject and the reference value A2 not to reach the threshold value Th2 even when the illuminance of the subject (the apparent illuminance of the subject) becomes high enough.

To avoid the above problem, concurrently with the judgment by the illuminance difference judgment unit 42, the high-illuminance judgment unit 43 determines whether the current illuminance of the subject (the apparent illuminance of the subject) is equal to or higher than the threshold value Th3 thereby detecting whether the current illuminance of the subject is high. In this state, the monitor camera 1 extracts the infrared cutoff filter 12 when the condition expressed in the form of inequality (2) or (3).

$$Ic \geq Th3 \quad (3)$$

where Ic is the current illuminance of the subject (expressed in luces).

If it is determined at a time t8 before a time t9 that the illuminance of the subject is equal to or higher than the threshold value Th3, the high-illuminance judgment unit 43 determines that the illuminance of the subject is high and further continuously checks the illuminance of the subject to determine whether the illuminance of the subject remains equal to or higher than the threshold value Th3 during a predetermined period of time.

If the illuminance of the subject has remained equal to or higher than the threshold value Th3 during the predetermined period of time, then, at a time t10 after the predetermined period of time, the monitor camera 1 inserts the infrared cutoff filter 12 into the incident light path. The insertion of the infrared cutoff filter 12 at time t10 causes the infrared component to be cut off from the incident light. After a waiting time has further elapsed since t10, the illuminance of the subject detected by the monitor camera becomes equal to the actual illuminance of the subject.

The threshold value Th3 may be freely set by a user, but it is desirable to previously set the threshold value Th3 to a fixed value as an absolute reference value according to which the infrared cutoff filter 12 is forced to be inserted.

As described above, when it is determined that the illuminance of the subject is low and the infrared cutoff filter 12 is extracted, the illuminance of the subjected detected in this state becomes higher than the actual illuminance of the subject. To handle this increase in the illuminance, the reference value for the illuminance in this state is calculated, and the current illuminance of the subject is compared with the reference value. If the difference between the current illuminance of the subject and the reference value becomes equal to or greater than the threshold value Th2, the infrared cutoff filter 12 is re-inserted. Therefore, even when the current illuminance of the subject is lower than the threshold value Th3 (corresponding to the threshold value α3 according to the conventional technique) set as the high-illuminance reference value, if the current illuminance of the subject is sufficiently high compared with the illuminance detected immediately after the extraction of the infrared cutoff filter 12, the infrared cutoff filter 12 is re-inserted thereby ensuring that an image with proper color information can be acquired from the incident light including no infrared component.

As described above, the threshold values Th1 and Th3 are used as absolute reference values with which to compare the current illuminance of the subject. In contrast, the threshold value Th2 is a relative reference value with which the current illuminance of the subject is compared in the state in which the infrared cutoff filter 12 is extracted and thus the detected illuminance of the subject becomes higher than the actual illuminance of the subject, and the re-insertion of the infrared cutoff filter 12 is controlled on the basis of the threshold value Th2.

Unlike the threshold values Th1 and Th3 which can become improper depending on the environment, the threshold value Th2 can be determined properly in any environment. The threshold value Th2 can be set easily, and the resultant threshold value Th2 allows it to control the infrared cutoff filter 12 in a highly reliable fashion.

Figure 2:
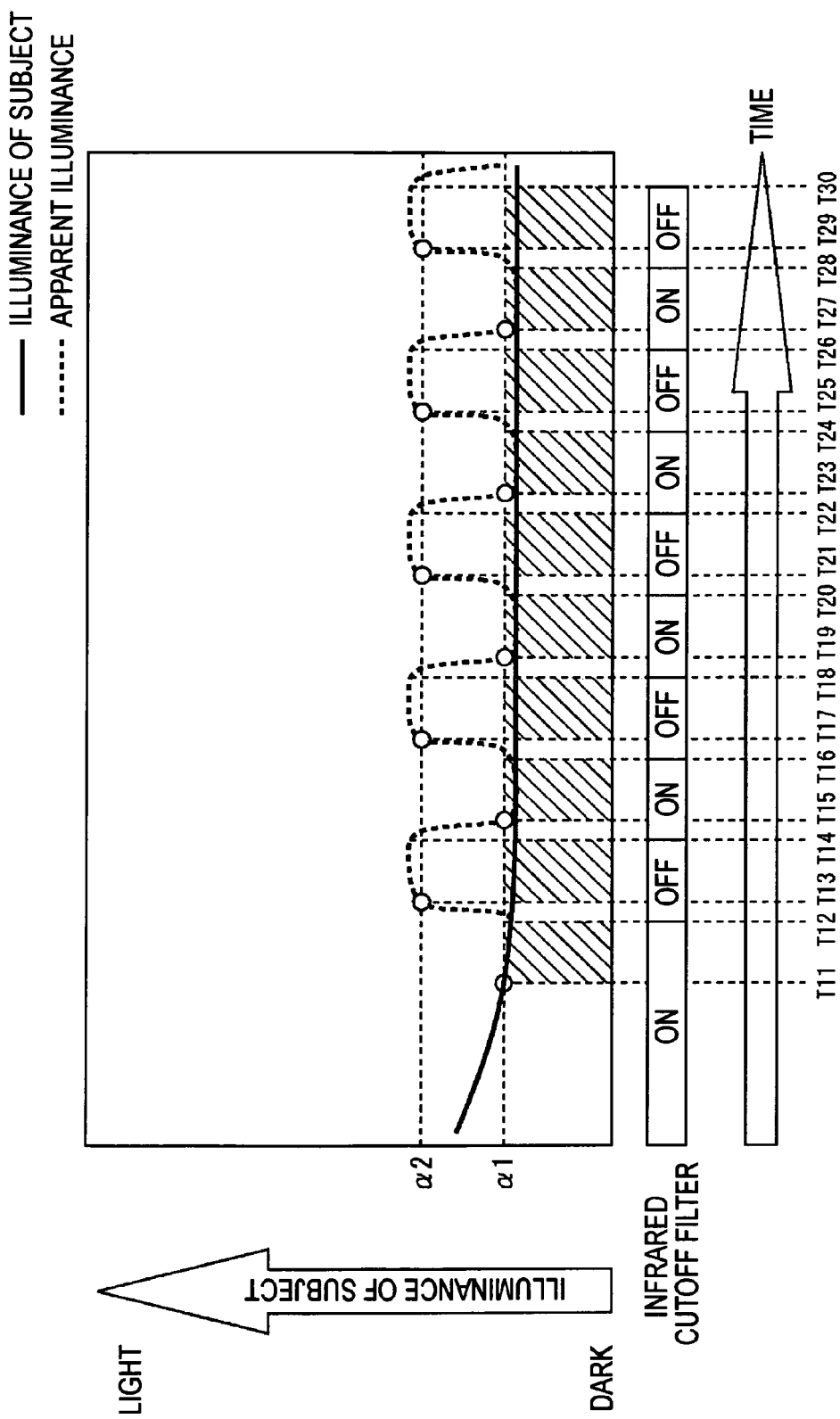
FIG. 2 is a diagram showing another example of a manner of determining whether to insert or extract an infrared cutoff filter according to a known technique.

In the monitor camera 1 according to the embodiment of the invention, unlike the conventional monitor camera, the operation of the infrared cutoff filter 12 is controlled taking into account the increase in the illuminance of the subject which occurs when the infrared cutoff filter 12 is extracted, and thus it is possible to prevent the hunting described above with reference to FIG. 2.

The use of the threshold value Th3 as the absolute high-illuminance reference value in addition to the threshold value Th2 makes it possible to handle a temporary short-time increase in the illuminance of the subject in the determination of the reference value.

As described above, the infrared cutoff filter 12 is properly inserted or extracted depending on the illuminance of the subject as described above, and thus it is possible to achieve high reliability in the operation of taking an image without encountering an incorrect operation of the infrared cutoff filter 12 regardless of the value of the illuminance of the subject.

Figure 6:
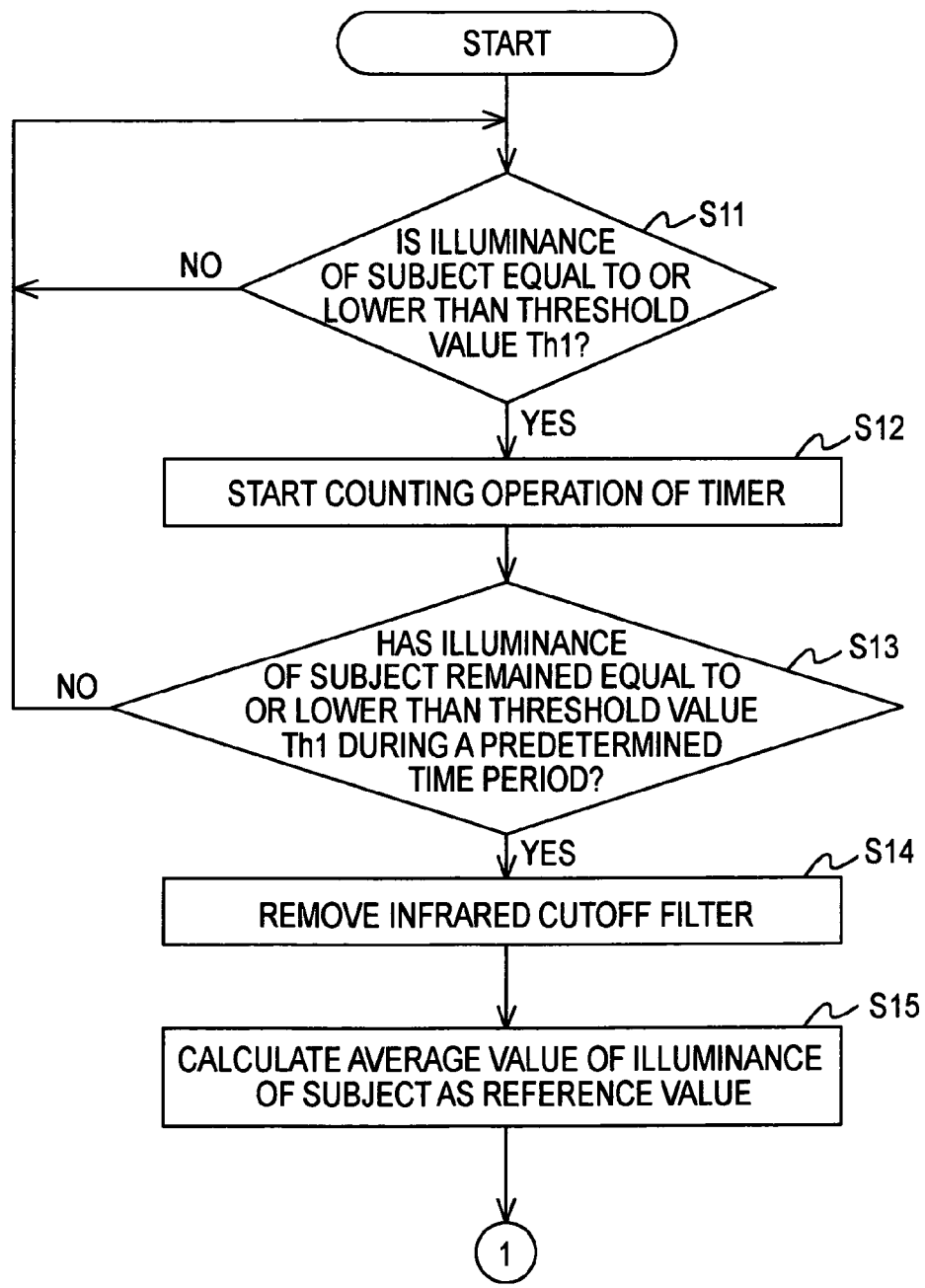
FIG. 6 is a flow chart showing a process associated with a monitor camera shown in FIG. 3.
Figure 7:
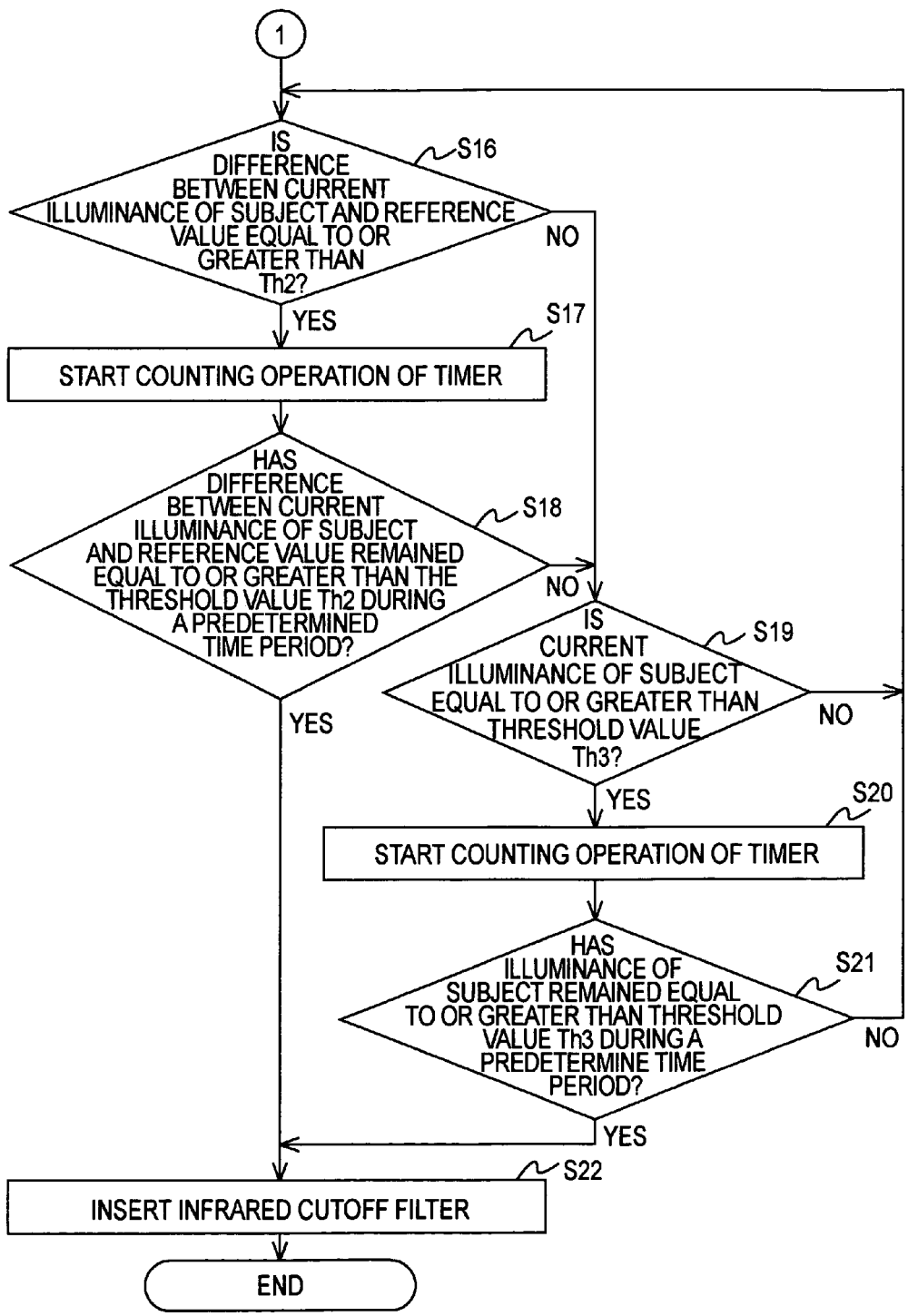
FIG. 7 is a flow chart showing a process associated with a monitor camera shown in FIG. 3.

Now, referring to flow charts shown in FIGS. 6 and 7, the process of controlling the insertion/extraction of the infrared cutoff filter 12 of the monitor camera 1 shown in FIG. 3 is explained. Herein, it is assumed that the monitor camera 1 is, at the start of the process, in the state in which the infrared cutoff filter 12 is inserted in the incident light path to the image sensing device 13 as shown in FIG. 3.

The image sensing device 13 senses an image of the subject from the light incident thereon from the optical system 11 via the infrared cutoff filter 12 and supplies the resultant image signal of the subject to the AFE unit 14. If the AFE unit 14 receives the image signal from the image sensing device 13, the AFE unit 14 removes noise from the image signal, adjusts the gain thereof, converts it from digital form into analog form, and supplies the resultant image signal to the camera signal processing unit 15.

The camera signal processing unit 15 performs particular signal processing on the image signal supplied from the AFE unit 14 and outputs the resultant image signal to a D/A converter 16. The D/A converter 16 converts the digital image signal into an analog image signal and outputs the resultant analog image signal to a video output terminal 17. The image signal supplied from the D/A converter 16 is output to the monitor device or the like (not shown) connected to the video output terminal 17, and an image with proper color information (that is, a color image) is displayed on the monitor device in accordance with the image signal.

The detector 15a of the camera signal processing unit 15 determines the illuminance of the subject (for example, in units of luces) from the image signal supplied from the AFE unit 14, and supplies the determined illuminance of the subject to the illuminance judgment unit 32. In this specific case, the actual illuminance of the subject is detected by the detector 15a and supplied as the current illuminance of the subject to the illuminance judgment unit 32.

In this state in which the infrared cutoff filter 12 is inserted in the incident light path, the switching controller 31 controls the low-illuminance judgment unit 41 of the illuminance judgment unit 32.

In step S11 in FIG. 6, the low-illuminance judgment unit 41 reads the threshold value Th1 (expressed, for example, in units of luces) from the nonvolatile memory 34 and determines whether the current illuminance of the subject is equal to or lower than the threshold value Th1.

If it is determined that the current illuminance of the subject is equal to or lower than the threshold value Th1, that is, if it is determined that the current illuminance of the subject is low, the process proceeds to step S12, in which the low-illuminance judgment unit 41 starts the counting operation of the timer 33.

In step S13, the low-illuminance judgment unit 41 continuously checks the illuminance of the subject to determine whether the current illuminance of the subject remains equal to or lower than the threshold value Th1 during a period of time counted by the timer 33 (for example, 5 seconds). If it is determined that the current illuminance of the subject has remained equal to or lower than the threshold value Th1 during the predetermined period of time, the determination result is sent to the switching controller 31. The process then proceeds to step S14.

On the other hand, in a case in which it is determined in step S11 that the current illuminance of the subject is neither equal to nor lower than the threshold value Th1 or it is determined in step S13 that the current illuminance of the subject has not remained equal to or lower than the threshold value Th1 during the predetermined period of time, the determination result is sent to the switching controller 31, and the process flow returns to step S11 to repeat the process from step S11.

In step S14, the switching controller 31 controls the motor driver 20 so as to extract the infrared cutoff filter 12.

More specifically, the switching controller 31 sends a driving command to the motor driver 20 to extract the infrared cutoff filter 12. In accordance with the driving command received from the switching controller 31, the motor driver 20 controls the operation of the filter driving motor 21. Under the control of the motor driver 20, the filter driving motor 21 extracts the infrared cutoff filter 12 from the position between the optical system 11 and the image sensing device 13, that is, from the position in the incident light path to the image sensing device 13.

Thereafter, the switching controller 31 sets a flag so as to indicate that the infrared cutoff filter 12 is in an extracted state in which it is off the incident light path.

Thereafter, in this state in which the infrared cutoff filter 12 is off the incident light path, the image sensing device 13 senses an image of the subject from the light directly incident thereon from the optical system 11 not via the infrared cutoff filter 12 and supplies the resultant image signal of the subject to the AFE unit 14. If the AFE unit 14 receives the image signal from the image sensing device 13, the AFE unit 14 removes noise from the image signal, adjusts the gain thereof, converts it from digital form into analog form, and supplies the resultant image signal to the camera signal processing unit 15.

The camera signal processing unit 15 performs predetermined signal processing on the image signal received from the AFE unit 14, and supplies the resultant image signal to the D/A converter 16. The D/A converter 16 converts the digital image signal into an analog image signal and outputs the resultant image signal to the video output terminal 17. The image signal output from the D/A converter 16 is supplied to a monitor device or the like (not shown) connected to the video output terminal 17, and an image is displayed on the monitor device in accordance with the image signal. Note that in this case, higher priority is given to the sensitivity than to the color information.

On the other hand, the detector 15a of the camera signal processing unit 15 determines the illuminance of the subject from the image signal received from the AFE unit 14, and supplies the determined illuminance of the subject and the illuminance judgment unit 32. Thereafter, as long as the monitor camera 1 is in this state, the apparent illuminance of the subject is supplied as the current illuminance of the subject from the detector 15a in a similar manner as described above with reference to FIG. 5.

In this state in which the infrared cutoff filter 12 is off the incident light path, the switching controller 31 the reference value calculation unit 35 and the illuminance difference judgment unit 42 and high-illuminance judgment unit 43 of the illuminance judgment unit 32.

In step S15, the reference value calculation unit 35 acquires values of the illuminance of the subject of a plurality of frames during a predetermined period of time (for example, 200 frames×16.7 msec), and calculates the average of the acquired values of the illuminance of the subject of the plurality of frames. The calculated average value is supplied as the reference value to the illuminance difference judgment unit 42.

In step S16 in FIG. 7, the illuminance difference judgment unit 42 reads the threshold value Th2 from the nonvolatile memory 34, determines the difference between the current illuminance of the subject and the reference value supplied from the reference value calculation unit 35, and determines whether the difference between the current illuminance of the subject and the reference value is equal to or greater than the threshold value Th2.

If it is determined in step S16 that the difference between the current illuminance of the subject and the reference value is equal to or greater than the threshold value Th2, it is determined that the current illuminance of the subject is high enough, and the process proceeds to step S17. In step S17, the illuminance difference judgment unit 42 starts the counting operation of the timer 33.

In step S18, the illuminance difference judgment unit 42 determines whether the difference between the current illuminance of the subject and the reference value remains equal to or greater than the threshold value Th2 during a period of time (for example, 5 seconds) counted by the timer 33. If it is determined that the difference between the current illuminance of the subject and the reference value has remained equal to or greater than the threshold value Th2 during the predetermined period of time, the determination result is sent to the switching controller 31, and the process proceeds to step S22.

On the other hand, in a case in which it is determined in step S16 that the difference between the current illuminance of the subject and the reference value is neither equal to nor higher than the threshold value Th2, or it is determined in step S17 that the difference between the current illuminance of the subject and the reference value has not remained equal to or greater than the threshold value Th2 during the predetermined period of time, the determination result is sent to the switching controller 31, and the process proceeds to step S19.

In step S19, the high-illuminance judgment unit 43 determines whether the current illuminance of the subject is equal to or higher than the threshold value Th3. If it is determined that the current illuminance of the subject is equal to or higher than the threshold value Th3, it is determined that the current illuminance of the subject is high, and the process proceeds to step S20. In step S20, the high-illuminance judgment unit 43 starts the counting operation of the timer 33.

In step S21, the high-illuminance judgment unit 43 continuously checks the illuminance of the subject to determine whether the current illuminance of the subject remains equal to or higher than the threshold value Th3 during a period of time (for example, 5 seconds) counted by the timer 33. If it is determined that the current illuminance of the subject has remained equal to or higher than the threshold value Th3 during the predetermined period of time, the determination result is sent to the switching controller 31, and the process proceeds to step S22.

In step S22, the switching controller 31 controls the motor driver 20 so as to insert the infrared cutoff filter 12.

More specifically, the switching controller 31 sends a driving command to the motor driver 20 to insert the infrared cutoff filter 12. In accordance with the driving command received from the switching controller 31, the motor driver 20 controls the operation of the filter driving motor 21. Under the control of the motor driver 20, the filter driving motor 21 inserts the infrared cutoff filter 12 into the position between the optical system 11 and the image sensing device 13, that is, into the position in the incident light path to the image sensing device 13.

Thereafter, the switching controller 31 sets the flag so as to indicate that the infrared cutoff filter 12 is in an inserted state in which it is inserted in the incident light path.

Thereafter, as long as the infrared cutoff filter 12 is in the inserted state, the image sensing device 13 senses incident light via the infrared cutoff filter 12 and thus the sensed light includes no infrared component, and an image with proper color information is displayed on the monitor device (not shown). In this state, the actual illuminance of the subject is supplied as the current illuminance of the subject to the illuminance judgment unit 32 as described above with reference to FIG. 5.

On the other hand, in a case in which it is determined in step S19 that the current illuminance of the subject is neither equal to nor higher than the threshold value Th3, or it is determined in step S21 that the current illuminance of the subject has not remained equal to or higher than the threshold value Th3 during the predetermined period of time, the determination result is sent to the switching controller 31, and the process flow returns to step S16 to repeat the process from step S16.

In the example described above with reference to the flow chart shown in FIG. 7, for convenience of explanation, it is assumed that step S19 is performed after step S16, but actually there is no restriction on the order of performing steps S16 and S19 and they are performed substantially concurrently. For example, the processing flow may proceed to step S19 from a point of flow between step S17 and step S18. Conversely, the processing flow may proceed to step S16 from a point of flow between step S20 and step S21.

As described above, the threshold value Th2 is defined as the relative reference value, and the insertion/extraction of the infrared cutoff filter 12 is controlled in accordance with the result of the comparison, with respect to the reference value, of the difference between the current illuminance of the subject and the illuminance of the subject detected in the state in which the infrared cutoff filter 12 is extracted and thus the detected illuminance becomes higher than the actual illuminance of the subject.

That is, in the embodiment of the present invention, unlike the conventional technique in which the insertion/extraction of the infrared cutoff filter 12 is controlled in accordance with the absolute comparison of the current illuminance with the original illuminance, the insertion/extraction of the infrared cutoff filter 12 is controlled in accordance with the relative comparison of the current illuminance with the reference illuminance.

Thus, in the embodiment of the present invention, even when the current illuminance of the subject is lower than the high threshold value Th3 as the absolute reference value, if the current illuminance of the subject is sufficiently high relative to the illuminance of the subject detected in the state in which the infrared cutoff filter 12 is extracted, the infrared cutoff filter 12 is inserted in the incident light path so that the image is sensed from the incident light including no infrared component. This makes it possible to easily set the threshold values to correctly control the operation of the infrared cutoff filter regardless of the environment.

In the monitor camera according to the embodiment of the present invention, unlike the monitor camera according to the conventional technique, the insertion/extraction of the infrared cutoff filter 12 is controlled taking into the account the effect of the phenomenon that when the infrared cutoff filter 12 is extracted, the illuminance of the subject increases and thus the detected illuminance (the apparent illuminance of the subject) becomes higher than the actual illuminance of the subject, and thus it is possible to prevent the hunting described above with reference to FIG. 2.

Furthermore, in the embodiment according to the present invention, the insertion of the infrared cutoff filter 12 is controlled on the basis of not only the threshold value Th2 but also the threshold value Th3 as the absolute high reference value, and thus it is possible to prevent an incorrect inserting operation from occurring when the reference value is incorrectly calculated due to a temporary short-time increase in the illuminance of the subject and thus the difference between the illuminance of the subject and the reference value does not reach the threshold value Th2 although the illuminance of the subject is actually high.

Thus, in the embodiment according to the present invention, the infrared cutoff filter is properly inserted or extracted depending on the illuminance of the subject, and thus it is possible to achieve high reliability in the operation of taking an image without encountering an incorrect operation of the infrared cutoff filter regardless of the value of the illuminance of the subject.

The present invention is applicable not only to the monitor camera described above but also to a wide variety of devices such as a digital still camera, a video tape recorder integrated with a camera, a portable telephone with a camera, a PDA (Personal Digital Assistance) device, a personal computer with a camera, etc.

The sequence of processing steps described above may be performed by means of hardware or software.

When the processing sequence is executed by software, a program forming the software may be installed from a program storage medium onto a computer which is provided as dedicated hardware or may be installed onto a general-purpose computer capable of performing various processes in accordance with various programs installed thereon.

Figure 8:
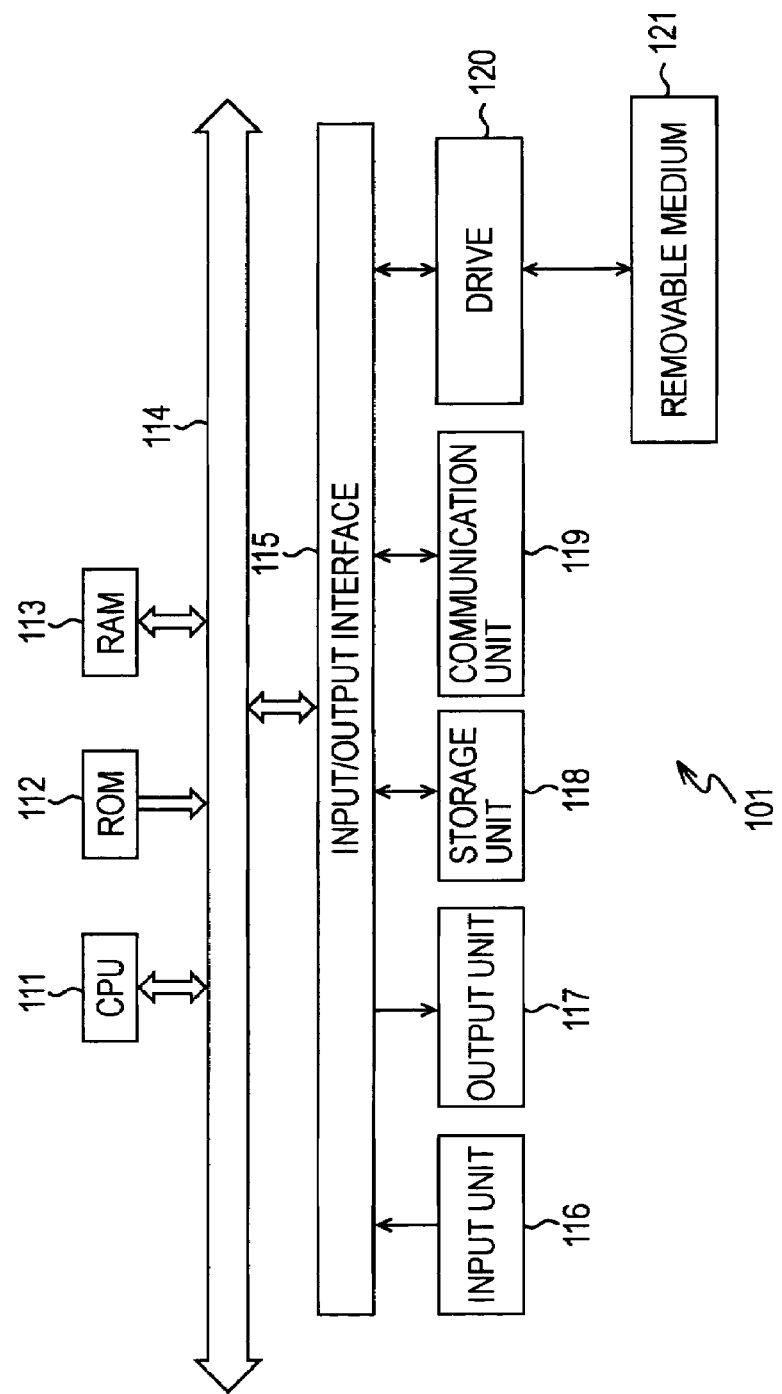
FIG. 8 is a block diagram showing an example of a configuration of a personal computer according to an embodiment of the present invention.

FIG. 8 is a block diagram showing an example of a configuration of a personal computer 101 for performing the sequence of processes described above by executing a program. A CPU (Central Processing Unit) 111 performs various processes in accordance with a program stored in a ROM (Read Only Memory) 112 or a storage unit 118. A RAM (Random Access Memory) 113 stores the program executed by the CPU 111 and also stores data used in the execution of the program. The CPU 111, the ROM 112, and the RAM 113 are connected to each other via a bus 114.

An input/output interface 115 is connected to the CPU 111 via the bus 114. The input/output interface 115 is also connected to an input unit 116 including a keyboard, a mouse, a microphone and the like and an output unit 117 including a display and a speaker. The CPU 111 performs various processes in accordance with commands input via the input unit 116 and outputs results of the processes to the output unit 117.

The storage unit 118 connected to the input/output interface 115 is realized, for example, by a hard disk and is adapted to store programs and data executed or used by the CPU 111.

A communication unit 119 is adapted to communicate with an external apparatus via a network such as the Internet or a local area network.

The program may be acquired via the communication unit 119 and stored in the storage unit 118.

When a removable medium 121 such as a magnetic disk, an optical disk, a magneto-optical disk or a semiconductor memory is mounted on a drive 120 connected to the input/output interface 115, the drive 120 drives the mounted removable medium 121 and acquires a program or data stored thereon. The acquired program or data is transferred, as required, to the storage unit 118 and stored therein.

As for the program storage medium for storing the program which is installed in the computer and executed on the computer, for example, as shown in FIG. 8, a removable medium 121 in the form of a package medium may be used. Specific examples include a magnetic disk (such as a floppy disk), an optical disk (such as a CD-ROM (Compact Disc-Read Only Memory, a DVD (Digital Versatile Disc), a magneto-optical disk, and a semiconductor memory. The program may be temporarily or permanently stored in the ROM 112 or the storage unit 118 realized, for example, by a hard disk. The program may be stored into the program storage medium via a wire communication medium such as a local area network or the Internet or via a wireless communication medium such as digital broadcasting, using the communication unit 119 serving as an interface such as a router or a modem.

In the present description, the steps described in the program stored in the program storage medium may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus including an infrared cutoff filter which is capable of being inserted into and extracted from an incident light path to an image sensing device, comprising:
   detecting means for, when the infrared cutoff filter is off the incident light path to the image sensing device, detecting whether the difference between current illuminance of a subject acquired from an image signal of the subject sensed by the image sensing device and a reference value of the illuminance of the subject after the infrared cutoff filter was extracted is equal to or greater than a threshold value; and
   filter control means for, when the detecting means detects that the difference between the current illuminance of the subject and the reference value of the illuminance of the subject is equal to or greater than the threshold value, inserting the infrared cutoff filter into the incident light path to the image sensing device,
   wherein the reference value of the illuminance of the subject is determined by calculating the average of values of the illuminance of the subject of a plurality of frames detected after the infrared cutoff filter was extracted from the incident light path to the image sensing device.

2. An imaging apparatus including an infrared cutoff filter which is capable of being inserted into and extracted from an incident light path to an image sensing device, comprising:
   detecting means for, when the infrared cutoff filter is off the incident light path to the image sensing device, detecting whether the difference between current illuminance of a subject acquired from an image signal of the subject sensed by the image sensing device and a reference value of the illuminance of the subject after the infrared cutoff filter was extracted is equal to or greater than a threshold value; and
   filter control means for, when the detecting means detects that the difference between the current illuminance of the subject and the reference value of the illuminance of the subject is equal to or greater than the threshold value, inserting the infrared cutoff filter into the incident light path to the image sensing device,
   wherein the first threshold value is set to an illuminance value corresponding to about 12 dB.

3. An imaging apparatus including an infrared cutoff filter which is capable of being inserted into and extracted from an incident light path to an image sensing device, comprising:
   detecting means for, when the infrared cutoff filter is off the incident light path to the image sensing device, detecting whether the difference between current illuminance of a subject acquired from an image signal of the subject sensed by the image sensing device and a reference value of the illuminance of the subject after the infrared cutoff filter was extracted is equal to or greater than a first threshold value; and
   filter control means for, when the detecting means detects that the difference between the current illuminance of the subject and the reference value of the illuminance of the subject is equal to or greater than the first threshold value, inserting the infrared cutoff filter into the incident light path to the image sensing device,
   wherein
   when the detecting means detects that the difference between the current illuminance of the subject and the reference value of the illuminance of the subject is equal to or greater than the threshold value, the detecting means further detects whether the difference between the current illuminance of the subject and the reference value of the illuminance of the subject remains equal to or greater than the threshold value during a predetermined period of time; and
   when the detecting means detects that the difference between the current illuminance of the subject and the reference value of the illuminance of the subject has remained equal to or greater than the threshold value during the predetermined period of time, the filter control means inserts the infrared cutoff filter into the incident light path to the image sensing device.

4. An imaging apparatus including an infrared cutoff filter which is capable of being inserted into and extracted from an incident light path to an image sensing device, comprising:
   first detecting means for, when the infrared cutoff filter is off the incident light path to the image sensing device, detecting whether the difference between current illuminance of a subject acquired from an image signal of the subject sensed by the image sensing device and a reference value of the illuminance of the subject after the infrared cutoff filter was extracted is equal to or greater than a first threshold value;
   filter control means for, when the first detecting means detects that the difference between the current illuminance of the subject and the reference value of the illuminance of the subject is equal to or greater than the first threshold value, inserting the infrared cutoff filter into the incident light path to the image sensing device; and
   second detecting means for, when the first detecting means detects that the difference between the current illuminance of the subject and the reference value of the illuminance of the subject is smaller than the first threshold value, detecting whether the current illuminance of the subject is equal to or greater than a second threshold value, wherein the filter control means also inserts the infrared cutoff filter into the incident light path to the image sensing device when the second detecting means detects that the current illuminance of the subject is equal to or greater than the second threshold value.

5. The imaging apparatus according to claim 4, wherein when the second detecting means detects that the current illuminance of the subject is equal to or greater than the second threshold value, the second detecting means further detects whether the current illuminance of the subject remains equal to or greater than the threshold value during a predetermined period of time, and the filter control means also inserts the infrared cutoff filter into the incident light path to the image sensing device when the second detecting means detects that the current illuminance of the subject has remained equal to or greater than the second threshold value during the predetermined period of time.

6. A method of controlling an imaging apparatus including an infrared cutoff filter which is capable of being inserted into and extracted from an incident light path to an image sensing device, comprising:

when the infrared cutoff filter is off the incident light path to the image sensing device, detecting whether a difference between current illuminance of a subject acquired from an image signal of the subject sensed by the image sensing device and a reference value of the illuminance of the subject determined after the infrared cutoff filter was extracted is equal to or greater than a threshold value; and when the detecting detects that the difference between the current illuminance of the subject and the reference value of the illuminance of the subject is equal to or greater than the threshold value, inserting the infrared cutoff filter into the incident light path to the image sensing device, wherein the reference value of the illuminance of the subject is determined by calculating an average of values of the illuminance of the subject of a plurality of frames detected after the infrared cutoff filter was extracted from the incident light path to the image sensing device.

7. A method of controlling an imaging apparatus including an infrared cutoff filter which is capable of being inserted into and extracted from an incident light path to an image sensing device, comprising:

when the infrared cutoff filter is off the incident light path to the image sensing device, detecting whether a difference between current illuminance of a subject acquired from an image signal of the subject sensed by the image sensing device and a reference value of the illuminance of the subject determined after the infrared cutoff filter was extracted is equal to or greater than a threshold value; and when the detecting detects that the difference between the current illuminance of the subject and the reference value of the illuminance of the subject is equal to or greater than the threshold value, inserting the infrared cutoff filter into the incident light path to the image sensing device, wherein the first threshold value is set to an illuminance value corresponding to about 12 dB.

8. A method of controlling an imaging apparatus including an infrared cutoff filter which is capable of being inserted into and extracted from an incident light path to an image sensing device, comprising:

when the infrared cutoff filter is off the incident light path to the image sensing device, detecting whether a difference between current illuminance of a subject acquired from an image signal of the subject sensed by the image sensing device and a reference value of the illuminance of the subject determined after the infrared cutoff filter was extracted is equal to or greater than a threshold value; and when the detecting detects that the difference between the current illuminance of the subject and the reference value of the illuminance of the subject is equal to or greater than the threshold value, inserting the infrared cutoff filter into the incident light path to the image sensing device, wherein when the detecting detects that the difference between the current illuminance of the subject and the reference value of the illuminance of the subject is equal to or greater than the threshold value, detecting whether the difference between the current illuminance of the subject and the reference value of the illuminance of the subject remains equal to or greater than the threshold value during a predetermined period of time; and when the difference between the current illuminance of the subject and the reference value of the illuminance of the subject is detected to have remained equal to or greater than the threshold value during the predetermined period of time, the infrared cutoff filter is inserted into the incident light path to the image sensing device.

9. A method of controlling an imaging apparatus including an infrared cutoff filter which is capable of being inserted into and extracted from an incident light path to an image sensing device, comprising:

when the infrared cutoff filter is off the incident light path to the image sensing device, detecting whether a difference between current illuminance of a subject acquired from an image signal of the subject sensed by the image sensing device and a reference value of the illuminance of the subject determined after the infrared cutoff filter was extracted is equal to or greater than a first threshold value;

when the detecting detects that the difference between the current illuminance of the subject and the reference value of the illuminance of the subject is equal to or greater than the first threshold value, inserting the infrared cutoff filter into the incident light path to the image sensing device; and when the difference between the current illuminance of the subject and the reference value of the illuminance of the subject is detected to be smaller than the first threshold value, detecting whether the current illuminance of the subject is equal to or greater than a second threshold value, wherein the infrared cutoff filter is inserted into the incident light path to the image sensing device when the current illuminance of the subject is detected to be equal to or greater than the second threshold value.

* * * * *